United States Patent [19]  [11] 3,837,861
Rakoczy  [45] Sept. 24, 1974

[54] GELATINO-SILVER HALIDE EMULSIONS CONTAINING MODIFIED GELATIN GRAFT COPOLYMERS

[75] Inventor: Bohdan Rakoczy, East Brunswick, N.J.

[73] Assignee: E. I. du Pont de Nemours and Company, Wilmington, Del.

[22] Filed: Mar. 23, 1973

[21] Appl. No.: 344,167

[52] U.S. Cl............ 96/114, 96/82, 96/111, 96/114.8
[51] Int. Cl............ G03c 1/72, G03c 1/02
[58] Field of Search............ 96/114, 114.8, 82; 260/117; 166/125

[56] References Cited
UNITED STATES PATENTS

| | | | |
|---|---|---|---|
| 2,831,767 | 4/1958 | Dann et al. | 96/114.8 |
| 2,956,880 | 10/1960 | Gates et al. | 96/114.8 |
| 3,061,436 | 10/1962 | Himmelmann et al. | 96/114.8 |
| 3,291,611 | 12/1966 | Krajewski | 96/114.8 |
| 3,778,278 | 12/1973 | Rakoczy | 96/114.8 |

*Primary Examiner*—J. Travis Brown

[57] ABSTRACT

Films prepared from emulsions containing a novel graft copolymer, made from the reaction between one or more ethylenically unsaturated monomers and a hydrolyzed and modified gelatin, exhibit a remarkable resistance to becoming desensitized, a defect which occurs when the film is handled or "kinked". The gelatin used herein may be first hydrolyzed with acid or base followed by reaction of the product therefrom with a dibasic acid anhydride prior to further reaction with the ethylenically unsaturated monomer to form the graft copolymer. In some instances, prior to formation of the graft copolymer, the product above may be further reacted with an aldehyde, such as allyl aldehyde or 2,4-dihydroxybenzaldehyde. These novel graft copolymers are added to the silver halide emulsion at any point during the preparation of the emulsion and are particularly useful in X-ray products.

32 Claims, No Drawings

GELATINO-SILVER HALIDE EMULSIONS CONTAINING MODIFIED GELATIN GRAFT COPOLYMERS

BACKGROUND OF THE INVENTION

1. Field of the Invention

This invention relates to silver halide emulsions containing gelatino binders and/or modified gelatino binders and a graft copolymer between a modified gelatin and one or more ethylenically unsaturated monomers. More particularly, this invention relates to emulsions containing the above binder system which exhibit improved photographic and physical properties. Still more particularly, this invention relates to a process for reducing the susceptibility of the finished film which contains the above binder system to become desensitized in areas which have been subjected to severe bending or kinking.

2. Description of the Prior Art

Additions and modifications to photographic binder systems for the purpose of enhancing the sensitometric and physical qualities of the finished film are well known. Jennings, for example, in U.S. Pat. No. 3,063,838 found that the addition of dextran to a gelatino-silver halide emulsion significantly increased the covering power of said emulsions. The use of dextran, however, tends to increase un-wanted optical haze and, in addition, does not alleviate the problem of desensitization due to kinking. The prior art also makes reference to mixtures of gelatin and certain acrylamides in order to improve the elasticity and flexibility of finished films. Considerable difficulty is encountered in making such mixtures as they are not compatible with the emulsion system. Coover in U.S. Pat. No. 2,794,787, filed Oct. 21, 1952 overcomes this problem by copolymerizing an unsaturated amide with the gelatin prior to addition to the emulsion system to provide a more flexible film product. The graft copolymers of Coover must, however, be cast from organic solvents thus adding expense and hazard to the system. Dann et al, in U.S. Pat. No. 2,831,767, filed Apr. 29, 1954, disclosed that a single monomer containing a

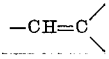

group could be polymerized with a saturated protein material to yield a water-soluble binder or binder supplement. None of these references teaches graft copolymers at all similar to those of this invention or that such copolymers will lower the tendency of a photographic film element made from them to densensitize in those areas where the finished film is kinked. A further discussion of the uses and investigations associated with gelatin graft copolymers is well described by Khismatullina et al. in Vysokomol. soedinenza 6, no. 3, 473–479 (1964) and again by Khismatullina et al. in Zhurnal Nauchn. i Prikl. Fotogr. i Kinematogr. 11, 81–87 (1966).

SUMMARY OF THE INVENTION

The primary object of this invention is to provide novel and useful binding agents or gelatino binder supplements for silver halide photographic emulsions.

A further object is to provide a silver halide photographic emulsion having improved properties.

A still further object is to provide a film element from said emulsion having a lower susceptibility to defects such as kinking, which occurs due to deformation of the silver halide grain and the like.

These and other objects are achieved by providing a gelatino-silver halide photographic emulsion containing a copolymer of at least one ethylenically unsaturated monomers and a hydrolyzed modified gelatin, said hydrolyzed modified gelatin being made by:

a. hydrolyzing a gelatin by heating in an aqueous solution of acid at pH 0.1 to 1.0 or base at pH 10.5 to 13.5, and b. reacting the hydrolyzed gelatin at pH 10 to 13.5 with at least one dibasic or tetrabasic acid anhydride. Additionally, one may react the product from step (b) at the same pH with 0.01 to 0.04 moles of allyl aldehyde, 2,4-dihydroxybenzaldehyde, or benzaldehyde o-sulfonic acid (alkali metal salt) per 100 grams of hydrolyzed modified gelatin, c. the product from step (b) is then reacted with the ethylenically unsaturated monomers by conventional methods to form a graft copolymer. The graft copolymer is then mixed with a suitable silver halide gelatino emulsion which may then be further treated and coated to form a photographic film.

DESCRIPTION OF THE PREFERRED EMBODIMENTS

A preferred method of practicing the process of this invention consists of:

a. hydrolyzing the gelatin by heating an aqueous hydrolyzed solution of, for example, 0.5 to 1.1N NaOH at 50°–70°C for about 1–2 hours;

b. reacting the hydrolyzed product at pH 10–13.5 with a dibasic or tetrabasic acid anhydride such as, for example, succinic anhydride, in an amount of 5 to 20 grams of acid anhydride per 100 grams of hydrolyzed gelatin;

c. reacting the above hydrolyzed and modified gelatin with, for example, vinylidene chloride in an inert atmosphere (e.g., nitrogen) at a pH of about 6.4 and a temperature of about 40°C for about 30 minutes followed by further reaction with, for example, n-butyl acrylate at about 56°C for about 1 hour, all in the presence of catalytic amounts of, for example, ammonium persulfate (e.g., about 1g/40g. of the modified gelatin) and sodium metabisulfite (e.g. about 1g/20g. of the modified gelatin) so the resulting ratio of the copolymer mixture is 22/50/28 vinylidene chloride/modified hydrolyzed gelatin/n-butyl acrylate respectively; and, d. adding said copolymer, as part of the gelatino binder, to a gelatino-silver halide emulsion preferably after the final sensitization is complete (e.g., just prior to coating on a film base) at about 25–110g/1.5 moles of silver halide or, alternatively, in somewhat smaller amounts (e.g., 5–15g/1.5 moles of silver halide) prior to the sensitization step.

Photographic elements made from emulsions so made exhibit a remarkable increase in their ability to overcome the effects of kinking while at the same time retain the same sensitometric characteristics found in photographic elements without the novel graft copolymers of this invention. Indeed, the elements of this invention may exhibit higher $D_{max}$ than the controls.

DETAILED DESCRIPTION

The first step in producing emulsions of the invention is to hydrolyze the gelatin which is to be used. This is done by admixing photographic grade gelatin with an aqueous acid hydrolyzing solution at pH 0.1 to 1.0 or an aqueous base hydrolyzing solution at pH 10.5 to 13.5. It is preferred that a 0.5 to 1.1N NaOH solution be employed for hydrolysis. However, any acid or base solution giving the hydrolysis pH ranges above under the conditions of hydrolysis described herein may be employed with equal success. These include HCl, HF, HBr, HI, $H_2SO_4$ and $HNO_3$ for acid solutions, for example, and NaOH, KOH, LiOH, RbOH, and CsOH for basic solutions. The mixture of gelatin and acid or base solution is heated for 1–2 hours at 50°–70°C. In the case of acid hydrolysis the mixture is then cooled to 40°C and the pH adjusted to 10.0 to 13.5 with 20 percent potassium hydroxide under moderate stirring. The hydrolyzed gelatin so made is then admixed at a pH of 10 to 13.5 with at least one dibasic or tetrabasic acid anhydride in an amount of 5–20 grams of the latter per 100 grams of hydrolyzed gelatin. This reaction mixture is then heated at 40°–55°C. for 1 to 4 hours to produce the modified hydrolyzed gelatin. In yet another embodiment, 0.01 to 0.04 moles of allyl aldehyde, 2,4-dihydroxybenz-aldehyde or benzaldehyde o-sulfonic acid (in the form of alkali metal salt) may then be reacted with the modified hydrolyzed gelatin under the same conditions. The modified hydrolyzed gelatin produced by reaction only with the acid anhydride is referred to herein as MHG (the preferred embodiment); that produced by reaction of MHG with the aldehyde is termed DMHG.

The modified hydrolyzed gelatin may then be copolymerized with, for example, one or more ethylenically unsaturated polymerizable monomers according to conventional methods for forming gelatin graft copolymers, e.g. by reacting the MHG or DMHG with one or more monomers (e.g., vinylidene chloride and n-butyl acrylate) so as to yield a 22/50/28 vinylidene chloride/MHG or DMHG/n-butyl acrylate weight ratio under an inert atmosphere (e.g., nitrogen) at a pH of 6–7.5 for 1.5 to 3.0 hours at 40°–60°C with a suitable reaction catalyst (e.g. ammonium persulfate, about 1g/40g of MHG or DMHG and sodium metabisulfite, about 1g/20g of MHG or DMHG). Alternatively, one may react the DMHG or MHG with a single monomer (e.g., ethyl acrylate, 31g/100g of MHG or DMHG) under an inert atmosphere (such as nitrogen) at a pH of 6.0–7.5 for 1 to 3 hours at 40°–60°C. with a suitable reaction catalyst such as ammonium persulfate (e.g., 1.72g/100g gelatin) and sodium metabisulfite (e.g., 0.93g/ 100g gelatin).

The graft copolymer is then added to the photographic emulsion, in the range of 25 grams to 110 grams of graft copolymer per 1.5 moles of silver halide, as a portion of the binding agent (e.g. in place of part of the gelatin). This addition preferably is made after the sensitization of the emulsion (e.g. with gold and sulfur) is complete and just prior to coating the emulsion on a suitable film support.

Alternatively, one may add the graft copolymer to the emulsion prior to any sensitization at somewhat lower levels (e.g. 5 grams to 15 grams of graft copolymer per 1.5 moles of silver halide) and achieve the same results.

When emulsions containing these novel graft copolymers are made as described above and are coated on suitable supports, they exhibit a remarkable resistance to kink desensitization. This defect occurs when a photographic element is bent severely, or kinked, prior to exposure and results in desensitization, a loss of density, in that area where the film has been so deformed. Such defects appear in the finished specimen as white areas and are particularly objectionable to the medical profession when appearing in, for example, medical x-ray radiographs. There they can be confused with tissue or bone and can produce erroneous radiographic interpretation and thus cannot be tolerated. They are also greatly objected to in the industrial x-ray field. Here, radiographs are made of metal objects such as girders and airplane parts to check for interior metal defects. Kink desensitization here also leads to erroneous results and cannot be tolerated. Kinking and the resulting desensitization is also objectionable in any other process using photographic elements although not as pronounced nor as intolerable as in the x-ray field. Very high speed photographic silver halide emulsions, e.g., for medical or industrial x-ray films, are characterized in that the silver halide grain is usually very large. Such emulsions, as well as others designed for rapid and/or continuous processing, are additionally prepared with a lower binder/silver ratio. Both of these factors contribute to the fact that films coated with these emulsions are more susceptible to strain on the silver halide grain itself which results in a desensitization when the film is severely bent or kinked as described above. Modification of the binder system by use of these novel graft copolymers herein described results in a substantial lessening of this susceptibility to become so desensitized.

Useful dibasic and tetrabasic acid anhydrides for modifying the hydrolyzed gelatin are those having aromatic, cycloalkane, heterocyclic structures and various substituted products thereof, having molecular weights of 98 or more.

The preferred anhydrides are diglycolic, succinic, maleic and phthalic acid anhydrides, and 1,2,4,5-benzene tetracarboxylic acid dianhydrides.

Preferred cycloalkanes or cycloalkenes are those comprising the general formula,

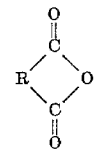

wherein R is a cycloalkane, e.g., 1,1-cyclopentane or 1,1-cyclohexane. Still others may be of the same general formula, wherein R is cyclohexane or cyclohexane having the carbonyls (CO) of the anhydride group attached thereto in cis-1,2positions, e.g., cis 1,2-cyclohexane dicarboxylic or cis-4-cyclohexane-1,2-dicarboxylic anhydrides.

Long chain substituted succinyl anhydrides such as 1-decenyl and 1-dodecenyl succinic anhydrides are also useful in accordance with the invention.

Also useful in the practice of this invention are certain anhydride derivatives of isatinic acid. Such compounds comprise a nitrogen-containing heterocyclic anhydride group fused on the aromatic ring of the following general formula,

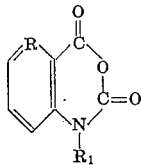

wherein R may be H, Cl, or $NO_2$ and $R_1$ is H or $CH_3$. Preferred compounds of this type are 6-chloroisatoic, 6-nitroisatoic and N-methylisatoic anhydrides.

Ethylenically unsaturated monomers suitable for copolymerizing with the modified hydrolyzed gelatin include acrylic, methacrylic and itaconic acids, alkyl and substituted alkyl esters and amides of said acids, ethyl acrylate n-butyl acrylate, methylmethacrylate, butyl methacrylate, diethylaminoethylmethacrylate, diethylaminoethylacrylate, glycidyl methacrylate, triethylene glycoldiacrylate, acrylamide, and acrylonitrile and vinylidene chloride. These compounds are preferably added singly or as mixture of two or more in the range of 25g to 165g per 100g of the MHG or DMHG along with a suitable catalyst for enhancing the reaction rate. A particularly useful catalyst system is that comprised of ammonium persulfate and sodium metabisulfite. Other free radical redox polymerization catalysts which might be used include those disclosed by Ashmore in "Catalysis and Inhibition of Chemical Reactions", Chapter 10, published by Butterworth, Inc. (1963).

It is preferred to add the ethylenically unsaturated monomer or monomers dropwise to MHG or DMHG dispersed in water with the suitable catalyst but any suitable addition system may be used which will prevent the system from reacting too violently. The mixture is allowed to react preferably in an inert atmosphere for about 1–4 hours at 32°–60°C. at a pH of about 6.2±0.5. After cooling and filtering at 30°–45°C. the resulting viscous liquid is preferably added to a gelatino-silver halide emulsion after the emulsion has been fully sensitized and just prior to coating on a suitable film support, as a binder supplement or addendum thereto. The sensitization may be achieved in a normal manner (i.e., with gold and sulfur) or by other techniques well known to those skilled in the art.

Alternatively, one may add the novel graft copolymers of this invention to the emulsion prior to the addition of the bulk of the binding agent (e.g., gelatin) at the step known as redispersion. At this stage, the silver halide, which has been precipitated with small amounts of gelatin, is vigorously stirred and the graft copolymer of this invention added. After dispersing the silver halide grains in water plus the graft copolymer, the remainder of the bulk gelatin or binder is added and the emulsion brought to its optimum sensitivity with, for example, gold and sulfur as described above. The MHG may also be added at this point along with suitable wetting agents, antifoggers, hardeners and coating aids. In addition, dyes and/or other sensitizers may be added as befits the emulsion to be used and well known to those skilled in the arts.

The graft copolymers made as disclosed above may be mixed as described below with any suitable gelatino-silver halide emulsion such as silver bromide, silver chloride, silver iodide or mixtures of two or three of these halides. Especially suitable are the emulsions used to prepare radiological films as disclosed by Jennings U.S. Pat. No. 3,063,838, Nov. 13, 1962, which are used for diagnostic work by the medical profession. Useful too are those emulsions disclosed by Nottorf in U.S. Pat. No. 3,142,568, July 28, 1964, which are comprised mainly of silver chloride (greater than 50 mole percent) and are used by the lithographic industry. These novel graft copolymers may also be used in higher speed negative films such as those used for motion picture work or for the taking of portraits, etc. These emulsions can be precipitated and washed as set forth in Moede, U.S. Pat. No. 2,727,165, Nov. 27, 1956, by the use of organic precipitating agents disclosed therein.

These radiological or x-ray films are comprised on a dry basis of essentially 25 to 75 percent silver halide (which is ca. 98 mole percent AgBr and ca. 2 mole percent AgI), 2.5 to 25 percent of either MHG- or DMHG-graft copolymer and 15 to 70 percent of gelatin. Additionally, the gelatin binder may be partially replaced with some of MHG itself, in the range 5 to 50 percent by weight. In fact when the novel graft copolymers are added at the redispersion step, it is preferred that some of the MHG or DMHG be subsequently incorporated in the emulsion mix. One may also incorporate certain amounts of dextran, polyvinyl alcohol or other well-known binder supplements known to those skilled in the art.

The photographic emulsions containing the novel graft copolymers of the invention may be coated on one or both sides of any suitable support such as cellulose acetate, triacetate, or mixed esters, for example, or polymerized vinyl compounds, e.g., copolymerized vinyl acetate and vinyl chloride, polystyrene and polymerized acrylates may also be used. A particularly useful transparent support is polyethylene terephthalate prepared and subbed as disclosed in Alles, U.S. Pat. No. 2,779,684, Example IV. Polyester films are particularly suitable because of their dimensional stability but any common, well-known photographic support may be used. It is common practice to coat emulsion for radiographic use on both sides of the support becuase of the need for a fairly thick layer of emulsion but this invention may also be practiced with single-side coated film. An abrasion layer is preferably coated on top of the emulsion to protect the surface of the film during handling and processing.

This invention will be illustrated by, but not limited to, the following examples.

EXAMPLE I

Modified, hydrolyzed gelatin (MHG) suitable for preparing a graft copolymer for use in this invention was made by reacting 250g. of low sulfur content bone gelatin at 55°–60°C, under agitation, for approximately one hour with 750 ml. of 1.0N aqueous NaOH. The mixture was then cooled to 40°C, at which point a pH of 12.4 to 12.8 was recorded, and 25g. of succinic anhydride added. This mixture was allowed to react at 45°–50°C for about one hour, (pH 9.5–9.7) cooled to 35°–40°C and the pH adjusted to 6.4±0.1. The resulting product contained about 25–28 percent MHG as solids.

To prepare a graft copolymer suitable for incorporation in an emulsion to achieve the desirable film structure of this invention a reaction vessel was purged with nitrogen and charged with 200 parts of the MHG solution made per above additionally containing 1.1 parts of sodium metabisulfite which had been dissolved in 8.8 parts of distilled water prior to adding to the MHG solution. The reaction vessel was kept under a nitrogen atmosphere during the entire reaction period. The contents were heated to 36°–40°C while stirring and 35 parts of vinylidene chloride and 50 parts of MHG solution containing 2.2 parts of ammonium bisulfate dissolved in 11 parts of distilled water were added separately at a rate designed to maintain a temperature of not more than 40°C. (exothermic reaction). After all the above ingredients were added the temperature was maintained at 40°C for 30 minutes under agitation. At this point, the temperature was increased to 45°C and a solution of 1.1 parts of sodium metabisulfite in 8.8 parts of distilled water were added. Then, 42 parts of n-butyl acrylate and 50 parts of MHG solution containing 2.2 parts of ammonium bisulfate in 11 parts of distilled water were added separately at a rate designed to maintain the exothermic reaction at 55°C. When all of this material had been added the mixture was held at 55°–57°C for about 1 hour and the product therefrom filtered for use. An analysis showed that the above product was 32.7 percent solids, had a pH of 4.84, a viscosity of 4.0 centipoises at 40°C (Brookfield Viscometer) and a theoretical composition of about 22/50/28 vinylidene chloride/MHG/n-butyl acrylate copolymer.

To test the usefulness of the above prepared graft copolymer a gelatino-silver iodobromide emulsion containing about 1.6 mole percent silver iodide and 98.4 mole percent silver bromide was precipitated and washed as described in Moede U.S. Pat. No. 2,772,165 and redispersed with gelatin (85g./1.5 moles of silver halide). The emulsion was then brought to its optimum level of sensitization in the manner taught in Jennings U.S. Pat. No. 3,063,838. Then, 25g./1.5 moles of silver halide of the graft copolymer made above were added along with the usual antifoggants, wetting aids, hardeners, etc. as taught in the prior art, along with 10g./1.5 moles of silver halide of an MHG made as described above. The emulsion was then coated on both sides of a polyethylene terephthalate film support so that the dried film contained about 150 milligrams of said emulsions per $dm^2$. A strip of approximately 8 inches by 10 inches from this coating was then kinked by bending the film until the two 8 inch edges were together and clipping them on a hard-board surface. A metal rod positioned about ⅜ inch above the surface of said board by attachment of the ends of the rod in grooves placed lengthwise on top of the board was then rolled down the board forcing the film into a flattened position thereby causing a severe kink or fold to be formed in the middle of the strip. This severe bend in the film causes strain to be exerted on the silver halide grain which is held in place by the gelled and dried binder and is similar to strains encountered during normal handling of the film, i.e., processing by machine. The strip so kinked was then given a 5 second exposure through an aluminum $\sqrt{2}$ step wedge, so that the line of the kink ran perpendicular to each step of the wedge, in an x-ray machine as taught in Jennings U.S. Pat. No. 3,063,838 and developed as disclosed therein. Severe desensitization was encountered in a control which was prepared without the novel graft copolymer while very little desensitization was noted in the emulsion containing the graft copolymer. This desensitization is recorded as a susceptibility to kinking which is determined by the difference in density at a density of 2.0 between the non-kinked area and the kinked area. Results are as follows:

| Sample | Sensitometry | | | Kink Susceptibility |
|---|---|---|---|---|
| | Fog | Speed | Dmax | |
| Control | .20 | 100 | 3.45 | .10 |
| With MHG-graft copolymer | .21 | 97 | 3.60 | .02 |

EXAMPLE 2

An emulsion was prepared as described in Example 1. After the sensitization was complete, it was split into 3 portions. To portion A there was added 17g./1.5 moles of silver halide of dextran as described in the Jennings patent. Portion B contained 25g./1.5 moles of silver halide of MHG and Portion C contained 45g./1.5 moles of silver halide of the MHG graft copolymer made according to Example 1. Other adjuvants were added as described in Example 1 and the emulsions were coated, dried, kinked, exposed and processed as described therein with the following results:

| Sample | Sensitometry | | | Kink Susceptibility |
|---|---|---|---|---|
| | Fog | Speed | Dmax | |
| Control with Dextran | .23 | 100 | 3.08 | .20 |
| Control with MHG | .24 | 113 | 3.42 | .23 |
| With MHG-graft copolymer | .25 | 120 | 3.04 | .02 |

EXAMPLE 3

An MHG graft copolymer containing equal parts of MHG and ethyl acrylate was prepared by placing 66 parts of an MHG solution (about 25–27 percent MHG) made as described in Example 1 in a suitable reaction vessel and purging thoroughly with nitrogen. After heating to 40°–45°C 17.8 parts of ethyl acrylate were added and thoroughly mixed with the MHG solution. About 1 part of ammonium persulfate freshly dissolved in 4.4 parts of distilled water and 0.51 parts of sodium metabisulfite dissolved in 4.4 parts of distilled water were then quickly added to the reaction mix and the reaction allowed to continue for about 1 hour at 50°–55°C. After filtering, the solution was found to contain 34 percent solids, 5.4 centipoise viscosity at 40°C and had a pH of 5.4.

This material was evaluated in an emulsion similar to that described in Example 1 containing 85g. of gelatin/1.5 moles of silver halide, with the material of this invention being added to the emulsion after the sensitization step and just prior to coating. All coating, drying, kinking, exposing, and processing conditions were as described in Example 1 and the following results were obtained:

| Sample | Sensitometry | | | Kink Susceptibility |
|---|---|---|---|---|
| | Fog | Speed | Dmax | |
| Control with Dextran | .23 | 100 | 3.23 | .20 |
| With 50g. MHG-EA graft copolymer/ 1.5 moles silver halide | .20 | 95 | 3.00 | .05 |
| With 75g. MHG-EA | .20 | 98 | 3.02 | .09 |

In a similar manner graft copolymers of MHG-ethyl acrylate (40/60), MHG-n-butyl acrylate (40/60) and MHG-methyl methacrylate (40/60) were prepared and tested as described above. All produced equivalent sensitometric results and a significant reduction in kink susceptibility.

The following examples will illustrate the ability of these graft copolymers to reduce the susceptibility to kinking when they are incorporated within the emulsion prior to sensitization of said emulsion.

EXAMPLE 4

A gelatino-silver iodobromide emulsion containing approximately 1.6 mole percent silver iodide and 98.4 mole percent silver bromide was precipitated and washed as described in Moede, U.S. Pat. No. 2,772,165 and the resulting precipitated emulsion divided into three portions herein after called A, B and C. Portion A (the control) was redispersed with 10g. of gelatin per 1.5 moles of silver halide while Portions B and C were redispersed 6g. and 12g. respectively, per 1.5 moles of silver halide, with an MHG-ethyl acrylate graft copolymer prepared as follows:

200g. of low sulfur content bone gelatin was stirred at 55°-60°C for approximately 1 hour in 800 ml. of a 0.5N aqueous NaOH solution, cooled to 40°C at which point a pH of 12.42 was recorded and then 6.7g. of succinic anhydride added. The resulting mixture was allowed to react at 45°-50°C for about 1 hour, cooled to 35°-40°C and the pH adjusted to 6.4±0.1 and the reaction vessel purged with nitrogen. A mixture of 31g. ethyl acrylate, 1.77g. ammonium persulfate and 0.93g. sodium metabisulfite per 100g. of the MHG prepared (dry basis) was added dropwise and the mixture allowed to react 1-3 hours at 48°-57°C. The resulting viscous liquid was filtered and used in the emulsion per above.

After thorough mixing of the silver halide grains with their respective portions of binder, the remainder of the binder consisting of gelatin was added so that each portion contained 115g. of total binder, and each portion brought to its optimum sensitivity with gold and sulfur as taught in Jennings U.S. Pat. No. 3,063,83. At the end of sensitization 20g. of dextran per 1.5 moles of silver halide was added to Portion A while 40g. of an MHG made by acid hydrolysis (HCl at pH 0.1 to 1.0, and further modified by reacting the hydrolyzed product at 45°-50°C with diglycolic anhydride for 2 hours) per 1.5 moles of silver halide was added to Portions B and C. The usual wetting agents, antifoggers and coating aides were also added. All three portions were then coated on both sides of a polyethylene terephthalate film support so that the dried film contained about 150 milligrams of said emulsions per dm². Strips of approximately 8 inches by 10 inches from each of these coatings were then kinked by bending the film until the two 8 inch edges were together and clipping them on a hard-board surface. A metal rod positioned about ⅜ inch above the surface of said board by attachment of the ends of the rod in grooves placed lengthwise on top of the board was then rolled down the board forcing the film into a flattened position thereby causing a severe kink or fold to be formed in the middle of the strip. This severe bend in the film causes strain to be exerted on the silver halide grain which is held in place by the gelled and dried binder and is similar to strain encountered during normal handling of the film, i.e. processing by machine. Each strip so kinked was then given a 5 second exposure through an aluminum $\sqrt{2}$ step wedge, so that the line of the kink ran perpendicular to each step of the wedge, in an x-ray machine as taught in Jennings U.S. Pat. No. 3,063,838 and developed as disclosed therein. Severe desensitization was encountered in the control in the area that was kinked while almost none was seen in the film from Portion B and none at all in the film from Portion C. This desensitization can be expressed by recording the sensitometric loss as follows:

| Sensitometry | Speed | Gradient | Dmax | After Kinking % Loss | | |
|---|---|---|---|---|---|---|
| | | | | Speed | Gradient | Dmax |
| Portion A Control | 103 | 2.54 | 3.16 | 11.1 | 0 | 1.2 |
| Portion B 6g. copolymer | 93 | 2.59 | 3.08 | 2.2 | 0 | 0 |
| Portion C 12g. copolymer | 97 | 2.79 | 3.40 | 0 | 0 | 0 |

Thus it can be seen that the use of the novel copolymer of this invention reduced the sensitometric loss due to kinking with an added advantage of increased Dmax.

EXAMPLE 5

A gelatino-silver iodobromide emulsion similar to that described in Example 4 was prepared, precipitated and washed and divided into three portions. Portion A (the control) was redispersed with 25g. of gelatin per 1.5 moles of silver halide; Portion B was redispersed with 10g. of MHG-ethyl acrylate copolymer, made as described in Example 4, per 1.5 moles of silver halide while Portion C was redispersed with 10g. of MHG - methyl acrylate copolymer which was made in a similar manner as Example 4 but substituting methyl acrylate for ethyl acrylate monomer, per 1.5 moles of silver halide. After redispersion 80g. of gelatin per 1.5 moles of silver halide was added to Portion A and 95g. of gelatin per 1.5 moles of silver halide to Portions B and C so that the level of binder in each portion was the same. Each portion was then brought to its optimum sensitivity as described in Example 4 and the same after-additions were made as shown in Example 4 along with 10g. of dextran to Portion A and 20g. of MHG to Portion B and C and the emulsions coated, kinked, exposed and processed as described in Example 4. The susceptibility to kinking, which is determined by the difference in density at a density of 2.0 between the nonkinked area and the kinked area, shows a marked decrease for Portions B and C where some of the gelatin was replaced by the novel graft copolymer of this invention. Results are as follows:

| Sample | Sensitometry | | | Kink Susceptibility |
| --- | --- | --- | --- | --- |
| | Speed | Gradient | Dmax | |
| Portion A Control | 160 | 1.81 | 3.08 | 0.15 |
| Portion B MHG-ethylacrylate copolymer | 155 | 2.11 | 3.16 | 0.03 |
| Portion C MHG-methyl acrylate copolymer | 160 | 2.28 | 3.42 | 0.10 |

EXAMPLE 6

A gelatino-silver iodobromide emulsion similar to that described in Examples 4 and 5 was made, split into seven portions and Portion A kept as control was treated as described in Example 4 while portions B–G were redispersed with various graft copolymers made as shown below:

Hydrolyzed gelatin (HG) was made by soaking a 20–40 percent aqueous solution of photographic grade bone gelatin in 0.25 to 1.0 N aqueous hydrochloric acid or 0.25 to 1.0N aqueous sodium hydroxide for 15 minutes followed by heating on a water bath at 55°–60°C while stirring continuously for 1–4 hours. After cooling the mixture to 40°C and adjusting the pH to 6.4–7.0 the reaction flask was purged with nitrogen and 1.72g. ammonium persulfate per 100g. gelatin (dry basis) plus 0.93g. sodium metabisulfite per 100g. gelatin (dry basis) added. Then, 31g. of ethyl acrylate per 100g. gelatin (dry basis) was added dropwise while maintaining a nitrogen purge and the resulting mixture allowed to react 1 to 3 hours at 48° to 57°C. The resulting viscous liquid was cooled and stored refrigerated for use in a photographic emulsion.

A sample of modified hydrolyzed gelatin (MHG) was prepared by adding 200 grams of low sulfur content, bone gelatin to 800 ml. of a 0.5N sodium hydroxide solution. The mixture was stirred at 55°–60°C. for approximately 1 hour and cooled to 40°C., at which point a pH of 12.42 was recorded, then 6.7 grams of succinic anhydride was added. Following reaction for 1 hour at 45°–50°C., the reaction mixture from this procedure was cooled to 35°–40°C. and the pH adjusted to 6.4±0.1 and purged with nitrogen. The MHG was then split into four portions and one portion copolymerized with methylmethacrylate, one with diethyleneglycoldiacrylate, one with acrylic acid and one with butylmethacrylate. The catalysts used and the ratios of acrylates to gelatins as well as the reaction conditions were the same as described above. The cooled and refrigerated mixture was stored for use in the photographic emulsion.

A sample of the gelatin which had been hydrolyzed and modified as described in Example 5 was further modified prior to reaction with the ethyl acrylate by adding 0.01 to 0.04 moles of benzaldehyde-o-sulfonic acid (sodium salt) per 100g. MHG (dry basis) while maintaining a high pH (10–13.5) and moderate agitation for 1–4 hours at 45°–50°C. This material (herein referred to as DMHG) was then reacted with ethyl acrylate per Example 5 and a viscous liquid obtained and refrigerated for further use.

All the copolymers were added during redispersion at 10g. of graft copolymer per 1.5 moles of silver halide. The emulsions were further treated, coated, kinked, exposed and developed as shown in Example 4 with the following results:

| Portion | Copolymer of | Sensitometry | | | Kink Susceptibility |
| --- | --- | --- | --- | --- | --- |
| | | Speed | Gradient | Dmax | |
| A | Control-gelatin | 159 | 2.89 | 3.90 | 0.09 |
| B | HG-ethylacrylate | 140 | 2.93 | 4.33 | 0.00 |
| C | MHG-methylmethacrylate | 155 | 2.48 | 4.26 | 0.00 |
| D | MHG-diethyleneglycoldiacrylate | 198 | 2.43 | 4.34 | 0.07 |
| E | MHG-acrylic acid | 174 | 2.38 | 3.92 | 0.04 |
| F | MHG-butylmethacrylate | 180 | 2.76 | 3.94 | 0.05 |
| G | DMHG-ethylacrylate | 145 | 2.61 | 4.10 | 0.00 |

EXAMPLE 7

A gelatino-silver iodobromide emulsion similar to that of Example 4 was prepared and split into seven portions with A kept as control and treated as described in Example 5 while B–G were redispersed with various graft copolymers made as shown in Examples 6 but with various monomers. All the copolymers were added at redispersion at 10g. of graft copolymer per 1.5 moles of silver halide and the emulsions further treated, coated, kinked, exposed and developed as described in Example 4 with the following results:

| Portion | Copolymer of | Sensitometry | | | Kink Susceptibility |
| --- | --- | --- | --- | --- | --- |
| | | Speed | Gradient | Dmax | |
| A | Control-gelatin | 177 | 2.16 | 3.08 | 0.15 |
| B | MHG-glycidylmethacrylate | 172 | 2.11 | 3.48 | 0.04 |
| C | MHG-methacrylic acid | 136 | 3.31 | 4.48 | 0.13 |
| D | DMHG[1]-ethylacrylate | 96 | 1.61 | 3.64 | 0.00 |
| E | DMHG[2]-ethylacrylate | 148 | 2.11 | 3.78 | 0.05 |
| F | DMHG[3]-ethylacrylate | 106 | 2.44 | 3.36 | 0.05 |
| G | DMHG[4]-ethylacrylate | 119 | 2.36 | 3.20 | 0.00 |

[1] MHG made with succinic anhydrides and further modified with allyl aldehyde
[2] MHG made with maleic anhydride and further modified with allyl aldehyde
[3] MHG made with succinic anhydride and further modified with 2,4-dihydroxybenzaldehyde
[4] MHG made with maleic anhydride and further modified with 2,4-dihydroxybenzaldehyde

EXAMPLE 8

In a similar manner an emulsion was made as shown in Example 4 and split into three portions with A as control and B and C containing graft copolymers shown below. All other treatments, coating, kinking, exposing and developing were as described in Example 4 with the following results:

| Portion | Copolymer of | Sensitometry | | | Kink Suscepti- bility |
|---|---|---|---|---|---|
| | | Speed | Gradient | Dmax | |
| A | Control-Gelatin | 143 | 2.22 | 3.20 | 0.17 |
| B | MHG-ethyl-acrylate | 133 | 2.46 | 3.62 | 0.04 |
| C | HG-ethyl acrylate | 95 | 2.50 | 3.92 | 0.02 |

EXAMPLE 9

A gelatino silver halide emulsion containing about 1.2 mole percent AgI and about 98.8 mole percent AgBr was prepared and precipitated as described in Example 4 and split into six portions. Portion A (the control) was redispersed with 190g. of gelatin per 1.5 moles of silver halide as were Portions B and C. Portions D, E and F were redispersed with 10g. of the MHG-ethylacrylate copolymer per 1.5 moles of silver halide of Example 4 prior to the addition of 180g. of gelatin per 1.5 moles of silver halide. All portions were then brought to their optimum sensitivity with gold and sulfur as described in Example 4. After adding the usual wetting agents, antifoggers and hardeners Portions A and D were coated without further addition while to B and E 45g. of MHG, were added and to C and F 40g. of dextran were added, all per 1.5 moles of silver halide. All portions were coated on polyethylene terephthalate base as described in Example 4. After drying, sheets of each coating were allowed to equilibrate in light-tight envelopes for 7 days at 70°F and 40 percent relative humidity. Samples of each of these equilibrated coatings were then placed in a hydraulic press having 1 inch diameter platens and various pressures from 1400 to 4200 pounds per square inch applied in increments of 1000 psi at various places on each coating. The coatings were then given an overall exposure to white light designed to produce a density of 2.0 and developed as described in Example 4. The pressure at which visible desensitization occurred was noted and is shown below:

| Portion | MHG Copolymer Added | MHG Added | Dextran Added | Press. (psi) to Produce Visible Desens. |
|---|---|---|---|---|
| A | None, Control | → | → | 2200 |
| B | None | Yes | None | 2800 |
| C | None | None | Yes | 2400 |
| D | Yes | None | None | 3100 |
| E | Yes | Yes | None | 3700 |
| F | Yes | None | Yes | 3700 |

These results show that a significant improvement can be obtained in that these films have a remarkable resistance to pressure desensitization when the new and novel graft copolymers of this invention are added to the binder system.

EXAMPLE 10

An emulsion, useful in preparing lithographic films, having a silver halide composition of about 70 mole percent AgCl and about 30 mole percent AgBr and about 20g. of gelatin per 1.5 moles of silver halide present during the precipitation and washing steps, was prepared, washed and coagulated as taught by Waller et al., U.S. Pat. No. 2,489,341. Following the coagulation step, the emulsion was split into two portions A and B. Portion A (the control) was redispersed in distilled water (1000 cc per 1.5 moles of silver halide) at 60°–65°F for 15 minutes while Portion B was redispersed as A but with 10g. of the MHG-ethylacrylate from Example 4 added per 1.5 moles of silver halide. Each was then redispersed with bulk gelatin, 70g. per 1.5 moles of silver halide in A and 60g. in B, so that the level of binder in each was the same. After adjusting the pH to about 7.4 and restoring the volume in each so as to account for any loss by evaporation, each emulsion was digested at elevated temperature with gold, sulfur and sensitizing dyes designed to raise the emulsion to its optimum sensitivity to green light. At the end of this sensitization period the emulsions were cooled and the usual wetting agents, antifoggers and hardeners added and each portion coated on polyethylene terephthalate film as described by Nottorf in U.S. Pat. No. 3,142,568, Example 1 to obtain the same coating weight as therein described. After drying, samples of these coatings were kinked as described in Example 4, above, and then exposed and developed as described in the above Nottorf reference and example with the following results:

| Portion | Base Plus Fog | Speed | amma | Dot Quality[1] at 2¼ Min. Dev. | Kink Suscepti- bility |
|---|---|---|---|---|---|
| A-Control | .05 | 33 | 10.2 | 3.9 | .05 |
| B-with MHG ethyl-acrylate copolymer | .05 | 35 | 10.0 | 3.6 | .03 |

[1] At 50% highlight dots. The lower the number the better the dot quality. (See Nottorf, U.S. 3,142,568)

Here it can be seen that although the effect on kink reduction is not as pronounced as in the faster, larger grain emulsion typical of medical x-ray film, one does obtain a marked and novel decrease in the susceptibility to kinking of even this finer grain emulsion.

EXAMPLE 11

An emulsion similar to that described in Example 4 was precipitated and washed as described therein and split into five portions (A, B, C, D and E). Portion A, the control was redispersed with 25g. of photographic grade gelatin per 1.5 moles of silver halide. Portion B was redispersed with 10g. of MHG-ethyl acrylate graft copolymer per 1.5 moles of silver halide wherein the MHG was made by hydrolysis of gelatin at pH 12.0 with LiOH followed by reaction with succinic anhydride and further formation of the graft copolymer with ethyl acrylate as described in Example 4. Portion C was redispersed with 10g. of MHG-ethyl acrylate graft copolymer per 1.5 moles of silver halide wherein the MHG was made by hydrolysis of gelatin with $HNO_3$ at pH 0.3 followed by adjustment of the pH to about 12, reaction with succinic anhydride and further formation of the graft copolymer with ethyl acrylate as described in Example 4. Portion D was redispersed with 10g. of DMHG-ethyl acrylate graft copolymer per 1.5 moles of silver halide wherein the MHG was made by hydrolysis of gelatin with HCl at pH 0.6 followed by adjustment of the pH to about 12 and reaction with succinic anhydride per Example 4. The MHG was then further modified by reaction with allyl aldehyde per Example 7 and the resultant product copolymerized with ethyl acrylate per Example 4. Portion E was redispersed with 10g. of MHG-ethyl acrylate graft copolymer per 1.5 moles of silver halide wherein the MHG was made by hydrolysis of gelatin with KOH at pH 12.9 followed by reaction with succinic anhydride and further formation of the graft copolymer with ethyl acrylate as described in Example 4. Bulk gelatin was added to each portion to obtain a total binder level of 105g. binder per 1.5 moles of silver halide and the emulsions brought to their optimum sensitivity with gold and sulfur. The usual coating and wetting aids were added to each portion along with hardeners and antifoggers along with 20g. of MHG made by hydrolyzing gelatin with NaOH plus reaction with succinic anhydride. All five portions were then coated on both sides of a polyethylene terephthalate film support (approximately 150 mg of silver halide/dm² coating weight), overcoated, dried, kinked, exposed and processed as described in Example 4 with the following results:

| Portion | MHG Hydrolyzed with | Speed | Gradient | Base Plus Fog | Dmax | Kink Susceptibility |
|---|---|---|---|---|---|---|
| A | Control Gelatin Only | 100 | 2.50 | .20 | 3.24 | 0.12 |
| B | LiOH | 106 | 2.45 | .23 | 3.55 | 0.02 |
| C | HNO₃ | 108 | 2.44 | .20 | 3.00 | 0.09 |
| D | HCl | 95 | 2.30 | .20 | 2.75 | 0.08 |
| E | KOH | 110 | 2.25 | .20 | 2.90 | 0.00 |

In a like manner, emulsions were made whereby MHG-graft copolymers were substituted for gelatin at the redispersion step and the MHG was made from gelatins hydrolyzed at pH 0.1 to 1.0 or 10.5 to 13.5 with a variety of acids and bases and all produced a significant decrease in kink susceptibility over gelatin alone.

Thus, it can be seen that an improvement over the prior art has been achieved and a severe deficiency common to photographic films, namely, desensitization due to kinking has been overcome. The novel water-soluble copolymers of the invention mix completely with photographic emulsions and provide excellent protection against kinking.

What is claimed is:

1. A silver halide photographic emulsion containing a gelatino binder and a graft copolymer of at least one ethylenically unsaturated polymerizable monomer and a modified hydrolyzed gelatin, said modified hydrolyzed gelatin being made by the process of
   a. hydrolyzing gelatin by heating in an aqueous solution containing a hydrolyzing agent selected from the group consisting of an acid having a pH in the range of about 0.1 to about 1.0 or a base having a pH in the range of about 10.5 to about 13.5, and
   b. reacting the hydrolyzed gelatin, at a pH of about 10 to about 13.5 with at least one dibasic or tetrabasic acid anhydride.

2. The silver halide photographic emulsion of claim 1 wherein said hydrolyzing agent is selected from the group consisting of about 0.5 to about 0.7N hydrochloric acid and about 0.5 to about 1.1N sodium hydroxide, and the step of hydrolyzing takes place at about 50° to about 70°C.

3. The silver halide photographic emulsion of claim 2 wherein said hydrolyzed gelatin is reacted with said acid anhydride in an amount of about 5 to about 20 grams of acid anhydride per 100 grams of modified hydrolyzed gelatin.

4. A silver halide photographic emulsion containing a copolymer of at least one ethylenically unsaturated polymerizable monomer and a modified hydrolyzed gelatin made according to the process of claim 1 having the additional step (c) of reacting the modified hydrolyzed gelatin at a pH of about 10 to about 13.5 with a substance selected from the group consisting of allyl aldehyde, 2,4-dihydroxybenzaldehyde or benzaldehyde o-sulfonic acid in amounts of about 0.01 to about 0.04 mole per 100 grams of modified hydrolyzed gelatin.

5. A silver halide photographic emulsion according to claim 1 wherein said acid anhydride is selected from the group consisting of maleic anhydride, succinic anhydride, diglycolic anhydride, phthalic anhydride, and 1,2,4,5-benzene tetracarboxylic acid dianhydride.

6. A silver halide photographic emulsion, according to claim 1, wherein said graft copolymer comprises at least two ethylenically unsaturated polymerizable monomers.

7. A silver halide photographic emulsion according to claim 1, wherein said graft copolymer comprises n-butyl acrylate and vinylidene chloride.

8. A silver halide photographic emulsion according to claim 1, wherein said ethylenically unsaturated polymerizable monomer is selected from the group consisting of acrylic, methacrylic, and itaconic acids and alkyl and substituted alkyl esters and amides of said acids.

9. The silver halide photographic emulsion of claim 1 wherein said ethylenically unsaturated polymerizable monomer is selected from the group consisting of ethyl acrylate, n-butyl acrylate, methylmethacrylate, butyl methacrylate, diethylaminoethylmethacrylate, diethyl-aminoethylacrylate, glycidyl methacrylate, triethylene glycoldiacrylate, acrylamide, acrylonitrile and vinylidene chloride.

10. The silver halide photographic emulsion of claim 1, wherein said gelatin binder also contains a modified hydrolyzed gelatin formed according to steps (a) and (b) in claim 1.

11. A process for forming a silver halide photographic emulsion comprising the steps of
   a. hydrolyzing gelatin by heating in an aqueous solution containing a hydrolyzing agent selected from the group consisting of an acid having a pH in the range of about 0.1 to about 1.0 or a base having a pH in the range of about 10.5 to about 13.5;
   b. reacting the hydrolyzed gelatin at a pH of about 10 to about 13.5 with at least one dibasic or tetrabasic acid anhydride;
   c. reacting the modified hydrolyzed gelatin with at least one ethylenically unsaturated monomer to form a graft copolymer; and
   d. adding said graft copolymer to a gelatino-silver halide emulsion.

12. The process of claim 11 wherein the step of reacting the modified hydrolyzed gelatin with at least one ethylenically unsaturated monomer comprises
   1. reacting the modified hydrolyzed gelatin with a first ethylenically unsaturated monomer and then 2. further reacting the product with a second ethylenically unsaturated monomer to form a graft copolymer.

13. The process of claim 12 wherein the first ethylenically unsaturated monomer is vinylidene chloride and the second ethylenically unsaturated monomer is n-butyl acrylate.

14. The process of claim 12 wherein the graft copolymer is added to the silver halide emulsion prior to sensitization of the emulsion in amounts of about 5 to about 15 grams of graft copolymer per 1.5 moles of silver halide.

15. The process of claim 12 wherein the graft copolymer is added to the silver halide emulsion after final sensitization of the emulsion in amounts of about 25 to about 110 grams of graft copolymer per 1.5 moles of silver halide.

16. The process of claim 12 wherein said graft copolymer is added to a modified hydrolyzed gelatin-silver halide emulsion.

17. The process of claim 12 wherein said modified hydrolyzed gelatin is reacted with a substance selected from the group consisting of allyl aldehyde, 2,4-dehydroxylbenzaldehyde or benzaldehyde o-sulfonic acid in amounts of about 0.01 to about 0.04 mole per 100 grams of modified hydrolyzed gelatin and at a pH of about 10 to about 13.5 prior to the reaction with said ethylenically unsaturated monomer.

18. The process of claim 12 wherein said hydrolyzing agent is selected from the group consisting of about 0.5 to about 0.7N hydrochloric acid and about 0.5 to about 1.1N sodium hydroxide.

19. The process of claim 12 wherein said modified hydrolyzed gelatin is reacted with said acid anhydride in an amount of about 5 to about 20 grams of acid anhydride per 100 grams of modified hydrolyzed gelatin.

20. The process of claim 12 wherein said acid anhydride is selected from the group consisting of maleic anhydride, succinic anhydride, diglycolic anhydride, phthalic anhydride, and 1,2,4,5-benzene tetracarboxylic acid dianhydride.

21. The process of claim 12 wherein said ethylenically unsaturated polymerizable monomer is selected from the group consisting of acrylic, methacrylic, and itaconic acids and alkyl and substituted alkyl esters and amides of said acids.

22. The process of claim 12 wherein said ethylenically unsaturated polymerizable monomer is selected from the group consisting of ethyl acrylate, n-butyl acrylate, methylmethacrylate, butylmethacrylate, diethylaminoethylmethacrylate, diethylaminoethylacrylate, glycidyl methacrylate, triethyleneglycoldiacrylate, acrylamide, acrylonitrile, and vinylidene chloride.

23. A photographic element comprising a support bearing at least one layer of a silver halide emulsion containing a gelatino binder and a graft copolymer of at least one ethylenically unsaturated polymerizable monomer and a modified hydrolyzed gelatin, said modified hydrolyzed gelatin being made by the process of a. hydrolyzing gelatin by heating in an aqueous solution containing a hydrolyzing agent selected from the group consisting of an acid having a pH in the range of about 0.1 to about 1.0 or a base having a pH in the range of about 10.5 to about 13.5, and b. reacting the hydrolyzed gelatin, at a pH of about 10 to about 13.5 with at least one dibasic or tetrabasic acid anhydride.

24. The element of claim 23 wherein said hydrolyzing agent is selected from the group consisting of about 0.5 to about 0.7N hydrochloric acid and about 0.5 to about 1.1N sodium hydroxide.

25. The element of claim 23 wherein said modified hydrolyzed gelatin is reacted with said acid anhydride in an amount of about 5 to about 20 grams of acid anhydride per 100 grams of modified hydrolyzed gelatin.

26. A photographic element in which the silver halide emulsion contains a copolymer of at least one ethylenically unsaturated polymerizable monomer and a modified hydrolyzing gelatin made according to the process set forth in steps (a) and (b) of claim 23 and the additional step (c) of reacting the modified hydrolyzed gelatin with a substance selected from the group consisting of allyl aldehyde, 2,4-dihydroxybenzaldehyde or benzaldehyde o-sulfonic acid in amounts of about 0.01 to about 0.04 mole per 100 grams of modified hydrolyzed gelatin and at a pH of about 10 to about 13.5.

27. The element of claim 23 wherein said acid anhydride is selected from the group consisting of maleic anhydride, succinic anhydride, diglycolic anhydride, phthalic anhydride, and 1,2,4,5-benzene tetracarboxylic acid dianhydride.

28. The element of claim 23 wherein said graft copolymer comprises at least two ethylenically unsaturated polymerizable monomers.

29. The element of claim 23 wherein said graft copolymer comprises n-butyl acrylate and vinylidene chloride.

30. The element of claim 23 wherein said ethylenically unsaturated polymerizable monomer is selected from the group consisting of acrylic, methacrylic, and itaconic acids and alkyl and substituted alkyl esters and amides of said acids.

31. The element of claim 23 wherein said ethylenically unsaturated polymerizable monomer is selected from the group consisting of ethyl acrylate, n-butyl acrylate, methylmethacrylate, butylmethacrylate, diethylaminoethylmethacrylate, diethylaminoethylacrylate, glycidyl methacrylate, triethyleneglycoldiacrylate, acrylamide, acrylonitrile and vinylidene chloride.

32. The element of claim 23 wherein said gelatino binder is a modified hydrolyzed gelatin formed according to steps (a) and (b) in claim 23.

* * * * *